United States Patent
Chen et al.

(10) Patent No.: US 11,991,026 B2
(45) Date of Patent: May 21, 2024

(54) CHANNEL FLATNESS COMPENSATION METHOD AND APPARATUS, STORAGE MEDIUM, BASEBAND CHIP, AND DEVICE

(71) Applicant: MORNINGCORE TECHNOLOGY CO., CHINA, Shanghai (CN)

(72) Inventors: Wenjie Chen, Shanghai (CN); Chaowei Yi, Shanghai (CN)

(73) Assignee: MORNINGCORE TECHNOLOGY CO., CHINA (CN)

( * ) Notice: Subject to any disclaimer, the term of this patent is extended or adjusted under 35 U.S.C. 154(b) by 72 days.

(21) Appl. No.: 17/769,634

(22) PCT Filed: Nov. 5, 2019

(86) PCT No.: PCT/CN2019/115541
§ 371 (c)(1),
(2) Date: Apr. 15, 2022

(87) PCT Pub. No.: WO2021/072832
PCT Pub. Date: Apr. 22, 2021

(65) Prior Publication Data
US 2023/0231747 A1 Jul. 20, 2023

(30) Foreign Application Priority Data
Oct. 17, 2019 (CN) .......................... 201910989395.5

(51) Int. Cl.
*H04K 1/10* (2006.01)
*H04L 25/02* (2006.01)
*H04L 25/03* (2006.01)

(52) U.S. Cl.
CPC ...... *H04L 25/03159* (2013.01); *H04L 25/022* (2013.01)

(58) Field of Classification Search
CPC .......................... H04L 25/03159; H04L 25/022
(Continued)

(56) References Cited

U.S. PATENT DOCUMENTS

2009/0221254 A1   9/2009   Kawauchi et al.
2011/0206105 A1   8/2011   Lin et al.
(Continued)

FOREIGN PATENT DOCUMENTS

CN   1331876 A   1/2002
CN   101465834 A   6/2009
(Continued)

OTHER PUBLICATIONS

International Search Report in International Application No. PCT/CN2019/115541, dated Jul. 15, 2020.
(Continued)

*Primary Examiner* — Zewdu A Kassa
(74) *Attorney, Agent, or Firm* — Kim IP Law Group LLC

(57) ABSTRACT

Provided are a channel flatness compensation method, a channel flatness compensation apparatus, a storage medium, a baseband chip, and a device, wherein the method is applied to a transmitting link modulated by orthogonal frequency division multiplexing and includes: receiving an input vector of a current sub-carrier subjected to sub-carrier mapping processing, and determining current values of preset configuration parameters corresponding to the current sub-carrier; querying a preset frequency domain compensation table according to the current values of the preset configuration parameters, and determining a target compensation vector according to a query result; and determining an output vector of the current sub-carrier according to the input vector and the target compensation vector, wherein the output vector is used in an inverse fast Fourier transform operation.

20 Claims, 9 Drawing Sheets

(58) Field of Classification Search
USPC .......................... 375/260, 259, 219, 295, 316
See application file for complete search history.

(56) References Cited

U.S. PATENT DOCUMENTS

| | | |
|---|---|---|
| 2012/0207254 A1 | 8/2012 | Park et al. |
| 2014/0119465 A1* | 5/2014 | Suh ..................... H04L 27/2647 |
| | | 375/267 |
| 2017/0126458 A1* | 5/2017 | Shattil .................... H04B 7/026 |

FOREIGN PATENT DOCUMENTS

| | | |
|---|---|---|
| CN | 104301264 A | 1/2015 |
| CN | 107181706 A | 9/2017 |
| WO | 0038386 A1 | 6/2000 |

OTHER PUBLICATIONS

Chinese Office Action in counterpart Chinese Patent Application No. 201910989395.5, mailed Aug. 26, 2023.
Written Opinion in International Application No. PCT/CN2019/115541, mailed Jul. 15, 2020.

* cited by examiner

CHANNEL FLATNESS COMPENSATION METHOD AND APPARATUS, STORAGE MEDIUM, BASEBAND CHIP, AND DEVICE

CROSS-REFERENCE TO RELATED APPLICATIONS

This is a national stage application filed under 37 U.S.C. 371 based on International Patent Application No. PCT/CN2019/115541, filed Nov. 5, 2019, which claims priority to Chinese Patent Application No. 201910989395.5 filed with the China National Intellectual Property Administration (CNIPA) on Oct. 17, 2019, the disclosures of which are incorporated herein by reference in their entireties.

FIELD

Embodiments of the present disclosure relate to the field of computer technologies, for example, to a channel flatness compensation method, a channel flatness compensation apparatus, a storage medium, a baseband chip, and a device.

BACKGROUND

With the application of the 5th generation mobile networks (5G) technology and ultra-broadband, the bandwidth of a transmitter or a receiver of the orthogonal frequency division multiplexing (OFDM) technology exceeds one hundred megahertz (MHz), which requires high flatness of transmitters, receivers and devices at radio frequency front end. At the same time, the requirements of multiple bandwidths and multiple frequency bands make the flatness problem more complicated. Taking a transmitting link as an example, the 3rd Generation Partnership Project (3GPP) and other specifications set requirements of "Error Vector Magnitude equalizer spectrum flatness" or similar indicators for transmission flatness.

In the related technical schemes to solve the problem of channel flatness, taking the transmitting link as an example, the unflatness characteristic of a transmitting channel is usually compensated using a finite impulse response (FIR) filter in a time domain. When a configuration bandwidth or a center frequency is changed, it is necessary to reconfigure FIR parameters and to restart a data link, which requires a certain response time and affects the continuity of data. In addition, when the signal bandwidth is wide, if it is required to compensate the unflatness of sub-carriers accurately, a very high order is required, and the computation amount and hardware overhead are huge, which makes it difficult to apply.

SUMMARY

Embodiments of the present disclosure provide a channel flatness compensation method, a channel flatness compensation apparatus, a storage medium, a baseband chip, and a device, which can optimize the channel flatness compensation schemes in the related art.

In a first aspect, embodiments of the present disclosure provide a channel flatness compensation method. The method is applied to a transmitting link modulated by orthogonal frequency division multiplexing and includes the steps described below.

An input vector of a current sub-carrier subjected to sub-carrier mapping processing is received, and current values of preset configuration parameters corresponding to the current sub-carrier is determined.

A preset frequency domain compensation table is queried according to the current values of the preset configuration parameters, and a target compensation vector is determined according to a query result.

An output vector of the current sub-carrier is determined according to the input vector and the target compensation vector, where the output vector is used in an inverse fast Fourier transform operation.

In a second aspect, embodiments of the present disclosure provide a channel flatness compensation method, which is applied to a receiving link modulated by orthogonal frequency division multiplexing and includes the steps described below.

An input vector of a current sub-carrier subjected to a fast Fourier transform operation is received, and current values of preset configuration parameters corresponding to the current sub-carrier is determined.

A preset frequency domain compensation table is queried according to the current values of the preset configuration parameters, and a target compensation vector is determined according to a query result.

An output vector of the current sub-carder is determined according to the input vector and the target compensation vector, where the output vector is used for performing sub-carrier mapping processing.

In a third aspect, embodiments of the present disclosure provide a channel flatness compensation apparatus. The apparatus is applied to a transmitting link modulated by orthogonal frequency division multiplexing and includes an input vector receiving module, a parameter value determining module, a target compensation vector determining module, and an output vector determining module.

The input vector receiving module is configured to receive an input vector of a current sub-carrier subjected to sub-carrier mapping processing.

The parameter value determining module is configured to determine current values of preset configuration parameters corresponding to the current sub-carrier.

The target compensation vector determining module is configured to query a preset frequency domain compensation table according to the current values of the preset configuration parameters, and determine a target compensation vector according to a query result.

The output vector determining module is configured to determine an output vector of the current sub-carrier according to the input vector and the target compensation vector, where the output vector is used in an inverse fast Fourier transform operation.

In a fourth aspect, embodiments of the present disclosure provide a channel flatness compensation apparatus. The apparatus is applied to a receiving link modulated by orthogonal frequency division multiplexing and includes an output vector receiving module, a parameter value determining module, a target compensation vector determining module, and an output vector determining module.

The output vector receiving module is configured to receive an input vector of a current sub-carrier subjected to a fast Fourier transform operation.

The parameter value determining module is configured to determine current values of preset configuration parameters corresponding to the current sub-carrier.

The target compensation vector determining module is configured to query a preset frequency domain compensation table according to the current values of the preset configuration parameters, and determine a target compensation vector according to a query result.

The output vector determining module is configured to determine an output vector of the current sub-carrier according to the input vector and the target compensation vector, where the output vector is used for performing sub-carrier mapping processing.

In a fifth aspect, embodiments of the present disclosure provide a computer-readable storage medium storing a computer program, and the computer program, when executed by a processor, performs the channel flatness compensation method according to the embodiments of the present disclosure.

In a sixth aspect, embodiments of the present disclosure provide a baseband chip storing a computer program, and the computer program, when executed by a processor, performs the channel flatness compensation method according to the embodiments of the present disclosure.

In a seventh aspect, embodiments of the present disclosure provide a terminal device. The terminal device includes a memory, a processor, and a computer program stored in the memory and executable by the processor, and the processor, when executing the computer program, performs the channel flatness compensation method according to the embodiments of the present disclosure.

DETAILED DESCRIPTION

Figure 1:
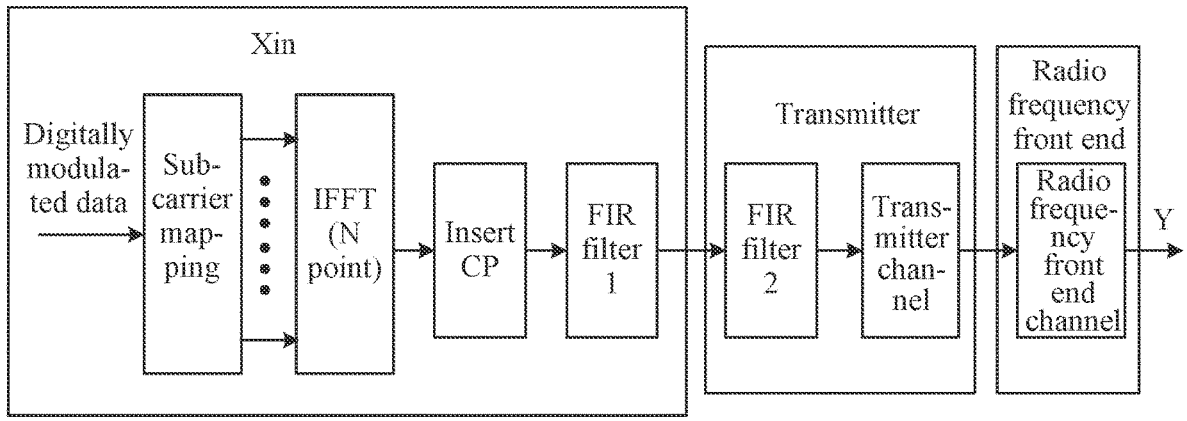
FIG. 1 is a schematic diagram of an implementation scheme for compensating channel flatness in the related art.

The technical solutions of the present application are further described below through specific implementations in conjunction with the drawings. It is to be understood that the embodiments described herein are intended to illustrate the present application and not to limit the present application. Additionally, it is to be noted that for ease of description, only part, not all, of structures related to the present application are illustrated in the drawings.

For ease of description, the implementation scheme to solve channel flatness in the related art is described below first. Taking a transmitting link as an example, the unflatness characteristic of a transmitting channel is usually compensated using a finite impulse response (FIR) filter in the time domain. FIG. 1 is a schematic diagram of an implementation scheme for compensating channel flatness in the related art. The implementation manners may generally be divided into three manners. In the first manner, a FIR filter is used to compensate the unflatness characteristic of a transmitter channel of a transmitter itself before a digital-to-analog converter (DAC) in the transmitter, which, for example, is the FIR filter 1 in FIG. 1. In the second characteristic, in a baseband chip, after an OFDM time domain signal is generated, a FIR filter is used to compensate the flatness of the whole transmitting channel, which, for example, is the FIR filter 2 in FIG. 1, where the baseband chip may include a chip manufactured based on the field-programmable gate array (FPGA) technology or application-specific integrated circuit (ASIC) technology. In the third manner, FIR filters are arranged in both the transmitter and the baseband, which, for example, are the FIR filter 1 in FIG. 1 and the FIR filter 2 in FIG. 1. The OFDM modulation may include CP-OFDM modulation or DFT-s-OFDM modulation, where CP refers to cyclic prefix and DFT-s refers to discrete Fourier transform-spread.

The above-mentioned three manners all have some defects. For the first manner, the transmitter uses a FIR filter to calibrate the unflatness of the transmitter itself, and it is difficult to predict the unflatness introduced by devices such as a front-end filter, a power amplifier, a mixer and a switch, so this characteristic can only solve local problems and cannot solve the unevenness problem of the whole transmitting link. Meanwhile, when a configuration bandwidth is changed, it is usually necessary to reconfigure FIR parameters and restart a data link, which requires a certain response time and affects the continuity of data. For the second manner, the FIR filter is used for compensation after the baseband OFDM signal is generated, although this manner can compensate the characteristic of the whole transmitting link, this manner lacks flexibility. For signals of a wide bandwidth, when a front-end radio frequency works at different frequency points (especially in a large frequency domain range), since the frequency response characteristics of front-end devices such as a power amplifier (PA) and a filter vary greatly, compensation parameters required are usually quite different, so different FIR parameters are required. Therefore, it is necessary to change FIR parameters when a center frequency is changed, and it is also necessary to change FIR parameters when a bandwidth configuration is switched and a frequency band is switched, which will cause the response time for restarting the data link and affect data continuity. For the third mode, there are still some problems such as the response time for restarting the data link and impact on the data continuity when FIR parameters are changed. Moreover, the above-mentioned three manners adopting FIR filters have the problem of computation amount or hardware overhead, and when the signal bandwidth is wide, if it is required to compensate the unflatness of sub-carriers accurately, a very high order is required. For example, when fast Fourier transform (FFT) with N=4096 is adopted, if it is required to compensate the unflatness of each sub-carrier accurately, a FIR filter of order N is at least required to perform an convolution operation, and the computation amount or the hardware overhead is unbearable. Therefore, the accuracy is also a big problem for the manners of using FIR filters to compensate the flatness. To sum up, the related art has certain defects in terms of unflatness calibration accuracy, computation amount, hardware overhead and flexibility and is not suitable for the application in transmission or reception compensation of multi-band signals in a wide bandwidth, large frequency domain range and multi-bandwidth mode.

Embodiment One

Figure 2:
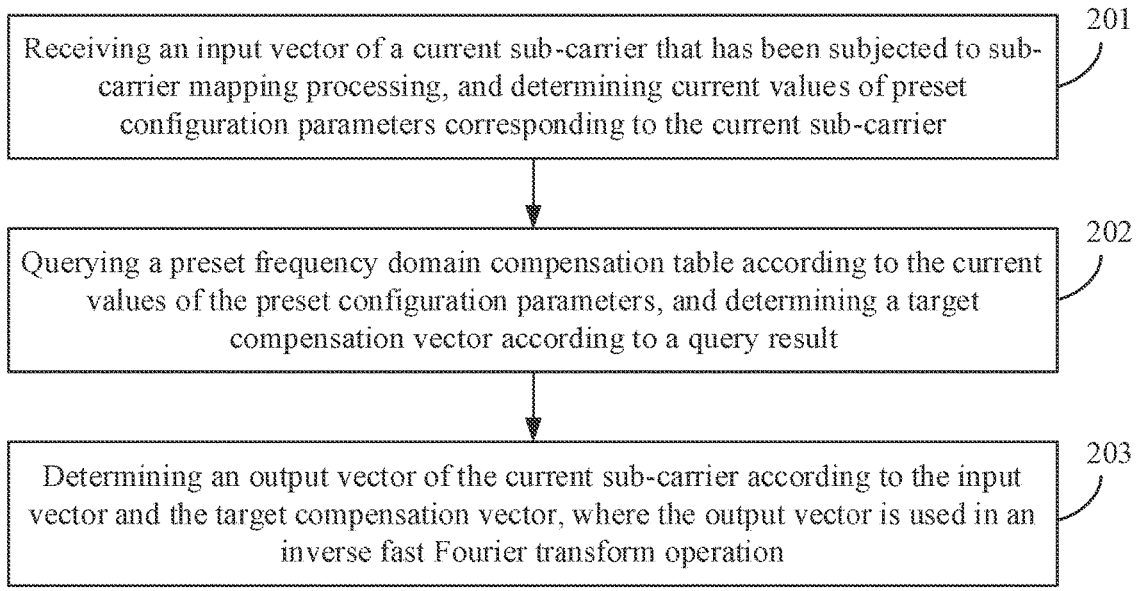
FIG. 2 is a flowchart of a channel flatness compensation method according to Embodiment one of the present disclosure.

FIG. 2 is a flowchart of a channel flatness compensation method according to Embodiment one of the present disclosure. The method may be executed by a channel flatness compensation apparatus. The apparatus may be implemented by hardware and/or software and generally integrated in a terminal device corresponding to a transmitting link modulated by orthogonal frequency division multiplexing. As shown in FIG. 2, the method includes steps 201, 202 and 203.

In step 201, an input vector of a current sub-carrier subjected to sub-carrier mapping processing is received, and current values of preset configuration parameters corresponding to the current sub-carrier is determined.

It is to be noted that in the present embodiments of the present disclosure, the flatness compensation processing may be performed on each sub-carrier that has been subjected to sub-carrier mapping processing in the frequency domain one by one or in parallel, and then each sub-carrier that has been subjected to the flatness compensation processing participates in an inverse fast Fourier transform (IFFT) operation, so that the compensation accuracy can reach the sub-carrier level.

Optionally, the digitally modulated data may be processed in other manners and then subjected to sub-carrier mapping, where the other manners, for example, may include discrete Fourier transform (DFT).

In an embodiment of the present disclosure, the causes of unflatness may be analyzed, a configuration parameter related to an amplitude distortion value may be determined and recorded as a preset configuration parameter, and then the flatness compensation amount (which, for example, may include an amplitude compensation amount) corresponding to each value of the preset configuration parameter may be determined by means of theoretical analysis, experiment or simulation to form a preset frequency domain compensation table. In the practical application, after the input vector of the current sub-carder that has been subjected to the sub-carrier mapping processing is received, the current values of the preset configuration parameters corresponding to the current sub-carrier is determined, which is used for querying the preset frequency domain compensation table.

In step 202, a preset frequency domain compensation table is queried according to the current values of the preset configuration parameters, and a target compensation vector is determined according to a query result.

For example, the preset frequency domain compensation table may be queried according to the current values of the preset configuration parameters, and a flatness compensation amount corresponding to the current value may be obtained, and then the target compensation vector may be calculated based on the flatness compensation amount. For example, the flatness compensation amount generally includes values within a certain frequency domain range, which may form a vector, and the vector may be subjected to null sub-carrier completion processing, so that the length of the finally obtained target compensation vector is consistent with the number of points of an IFFT operation that is to be performed next.

In the present embodiments of the present disclosure, through the manner of directly querying the preset frequency domain compensation table, the corresponding target compensation vector may be obtained quickly and accurately, and the channel flatness for transmitting an OFDM signal may be compensated immediately, so that the filtering parameters do not need to be reconfigured, no response time needs to wait, the streaming of a baseband data channel is continuously valid, and the problem of useless excessive data existing in the response time due to filter configuration does not exist.

In step 203, an output vector of the current sub-carrier is determined according to the input vector and the target compensation vector, where the output vector is used in an inverse fast Fourier transform operation.

For example, the output vector of the current sub-carrier may be obtained by performing a certain operation according to the input vector and the target compensation vector, where the operation, for example, may be vector addition or vector multiplication.

In the present embodiments of the present disclosure, sub-carriers are subjected to the channel flatness compensation processing, then subjected to the IFFT operation and enter a transmitter channel and a radio frequency front-end channel. Since compensation has been completed before the IFFT operation, the impact of the transmitter channel and the radio frequency front-end channel on signals is basically eliminated, so that the signals outputted through the radio frequency front-end channel can meet higher flatness requirements.

The channel flatness compensation method provided by the present embodiments of the present disclosure may be applied to a transmitting link modulated by orthogonal frequency division multiplexing and includes: receiving an input vector of a current sub-carrier subjected to sub-carrier mapping processing, determining current values of preset configuration parameters corresponding to the current sub-carrier, querying a preset frequency domain compensation table according to the current value, determining a target compensation vector according to a query result, and determining an output vector of the current sub-carrier according to the input vector and the target compensation vector, where the output vector is used in an inverse fast Fourier transform operation. Through the above-mentioned technical solution, a pre-configured frequency domain compensation table is queried so that the flatness compensation can be performed for the input vector of the sub-carrier in the frequency domain immediately and accurately, the filtering parameters do not need to be reconfigured, no response time needs to wait, and the compensation accuracy can reach the sub-carrier level.

Embodiment Two

Figure 3:
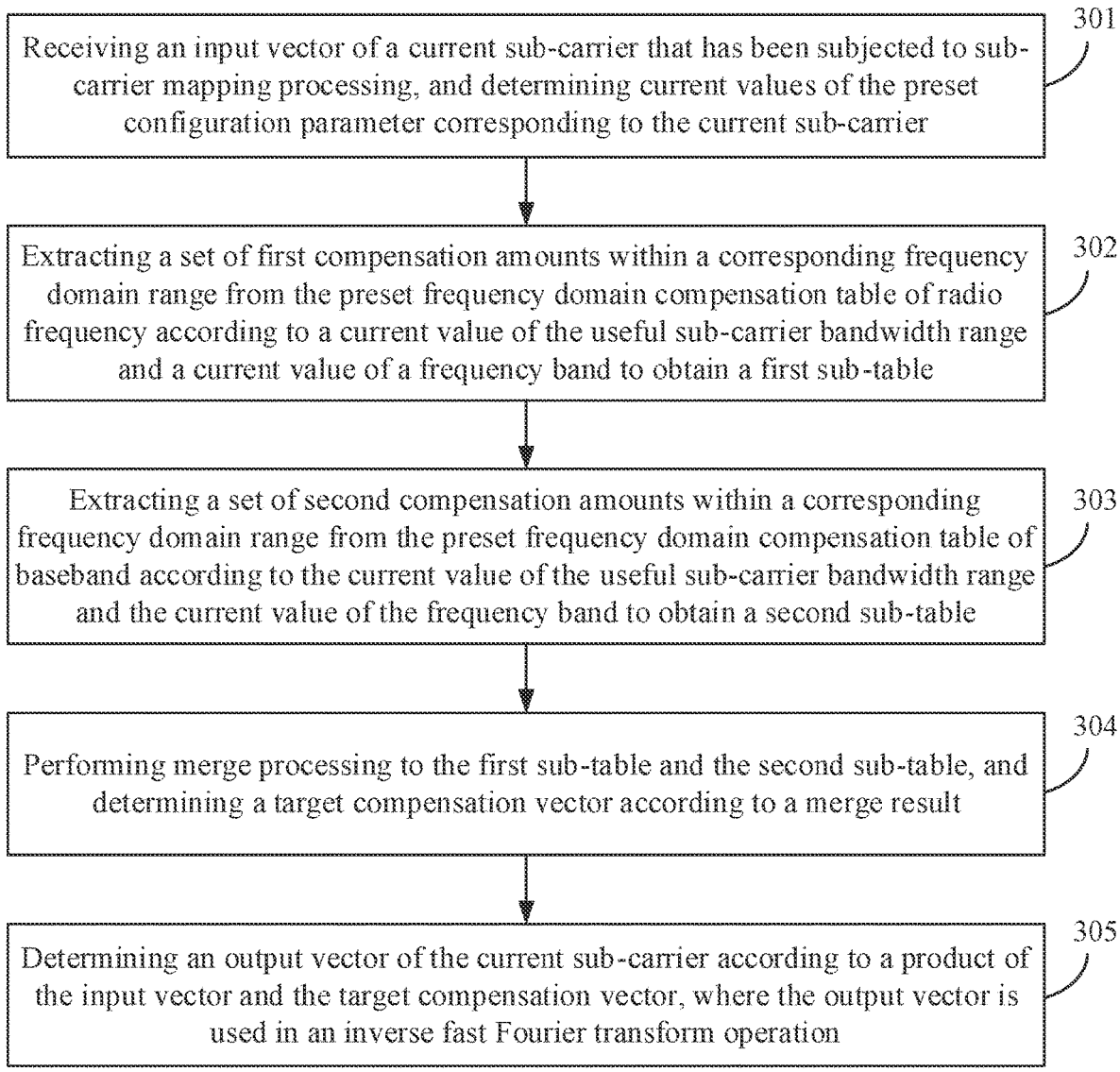
FIG. 3 is a flowchart of a channel flatness compensation method according to Embodiment two of the present disclosure.

FIG. 3 is a flowchart of a channel flatness compensation method according to Embodiment two of the present disclosure. The present embodiments of the present disclosure are modified on the basis of the above-mentioned optional embodiments.

Figure 4:
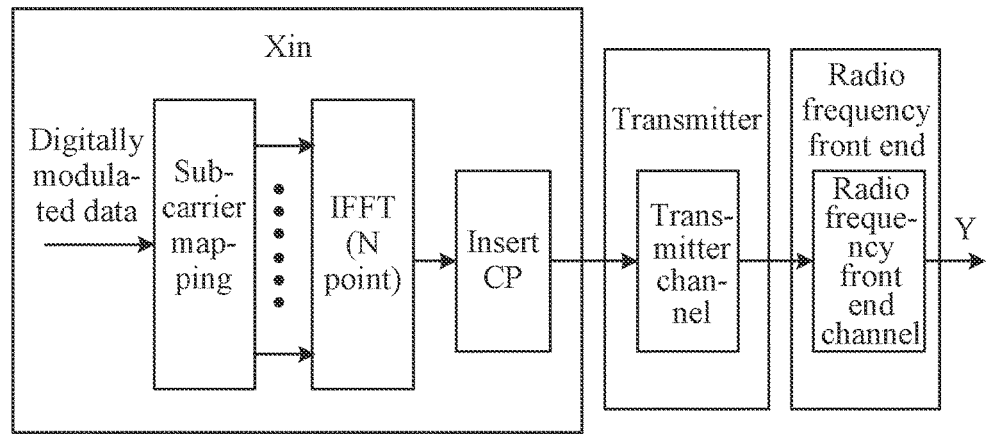
FIG. 4 is a block diagram of a transmitting link without flatness compensation according to Embodiment two of the present disclosure.
Figure 5:
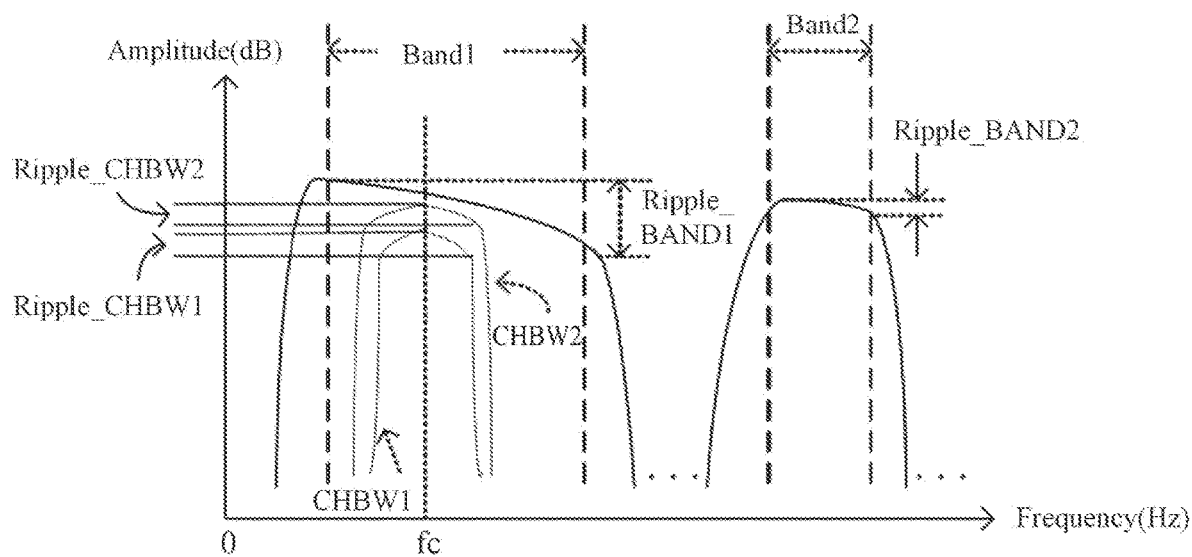
FIG. 5 is a schematic diagram of analysis of the cause of introduction of an unflatness characteristic according to Embodiment two of the present disclosure.

For example, the preset configuration parameters include: a useful sub-carrier bandwidth range, a carrier frequency, and a frequency band and/or a bandwidth. When the preset configuration parameters include a frequency band, the preset frequency domain compensation table includes a preset frequency domain compensation table of radio frequency; and when the preset configuration parameters include a bandwidth, the preset frequency domain compensation table includes a preset frequency domain compensation table of baseband. FIG. 4 is a block diagram of a transmitting link without flatness compensation according to Embodiment two of the present disclosure. FIG. 5 is a schematic diagram of analysis of the cause of introduction of an unflatness characteristic according to Embodiment two of the present disclosure. The source causing the amplitude unflatness and the phase unlinearity is the impact of analog devices and digital processing, which may be divided into two aspects. In the first aspect, in a transmitter channel, the unflatness is usually caused due to the filtering characteristic of a baseband channel after a DAC, and various processing of a digital baseband before the DAC also have unsatisfactory frequency characteristics. This kind of unflatness is closely related to the channel bandwidth configuration and has little to do with the working frequency domain, and the amplitude distortion value and the phase distortion value are functions of the frequency offset from the center of the sub-carrier. For example, Ripple_CHBW1, and Ripple_CHBW2 in FIG. 5 are the amplitude distortion characteristics in the CHBW1 (bandwidth 1) and CHBW2 (bandwidth 2) configurations, respectively. In the second aspect, in a radio frequency front-end channel, the unflatness is usually caused by a radio frequency filter, a power amplifier and a mixer together, and meanwhile, the loss difference of transmit lines within a broadband frequency domain range also causes the flatness difference in the frequency domain. The second kind of unflatness is closely related to the frequency domain characteristics of the device and has little to do with the bandwidth configuration, and it may be considered that the amplitude distortion value and the phase distortion value are functions of an absolute frequency. For example, Ripple_BAND1 and Ripple_BAND2 in FIG. 5 are the amplitude distortion characteristics in the BAND1 (frequency band 1) and BAND2 (frequency band 2) configurations, respectively. In the case of multi-bandwidth mode and multiple bands, the flatness characteristic of the transmitting channel is a combination of the unflatness of the transmitter channel (assuming that there are P configurations, that is, P bandwidths) and the radio frequency front-end channel (assuming that there are Q configurations, that is, Q frequency bands), so there are P×Q combinations, and it is difficult to adapt to such complex applications in the related art. After the above-mentioned analysis, there are two causes of unflatness, and the flatness compensation may be performed for either or both of them. Therefore, the preset configuration parameters may include a useful sub-carrier bandwidth range, a carrier frequency, and one or both of the frequency band and the bandwidth. It is to be understood that with the flatness compensation for both the above-mentioned two causes, a better compensation effect can be obtained, which will be described in detail below, while other cases can be undoubtedly obtained by those skilled in the art with reference to relevant contents.

In some embodiments, the preset frequency domain compensation table of radio frequency includes a frequency band index number, a carrier frequency and a first compensation amount, where the first compensation amount includes a first amplitude compensation amount; and the preset frequency domain compensation table of baseband includes a bandwidth index number, a sub-carrier frequency offset and a second compensation amount, where the second compensation amount includes a second amplitude compensation amount. In the present embodiments of the present disclosure, the preset frequency domain compensation table of radio frequency and the preset frequency domain compensation table of baseband can be simultaneously set and compensate for the signal amplitude.

In some embodiments, the first compensation amount also includes a first phase compensation amount; and/or the second compensation amount also includes a second phase compensation amount. Such an arrangement has the advantage that on the basis of the compensation for the signal amplitude, the compensation amount may also include a phase compensation amount, so that the phase distortion characteristic can be compensated at the same time.

In some embodiments, the preset configuration parameters include a useful sub-carrier bandwidth range, a carrier frequency, a frequency band and a bandwidth. The step where a preset frequency domain compensation table is queried according to the current values of the preset configuration parameters, and a target compensation vector is determined according to a query result includes: a set of first compensation amounts within a corresponding frequency domain range is extracted from the preset frequency domain compensation table of radio frequency according to a current value of the useful sub-carrier bandwidth range and a current value of a frequency band to obtain a first sub-table; a set of second compensation amounts within a corresponding frequency domain range is extracted from the preset frequency domain compensation table of baseband according to the current value of the useful sub-carrier bandwidth range and the current value of the frequency band to obtain a second sub-table; and merge processing is performed to the first sub-table and the second sub-table, and the target compensation vector is determined according to a merge result.

In some embodiments, the method includes steps 301, 302, 303, 304 and 305.

In step 301, an input vector of a current sub-carrier subjected to sub-carrier mapping processing is received, and current values of preset configuration parameters corresponding to the current sub-carrier is determined.

The preset configuration parameters include a useful sub-carrier bandwidth range, a carrier frequency, a frequency band and a bandwidth. In the present embodiments of the present disclosure, a preset frequency domain compensation table of radio frequency and a preset frequency domain compensation table of baseband may be produced and calibrated in advance, a flatness calibration value of each sub-carrier of OFDM signals of a current bandwidth, a frequency band and a carrier frequency are calculated, and the flatness is compensated using the frequency domain sub-carrier. Therefore, the flatness of transmitting radio frequency can be improved, and the nonlinear distortion of the phase can also be improved. The OFDM modulation includes CP-OFDM modulation or DFT-s-OFDM modulation.

For example, the preset frequency domain compensation table of radio frequency is used for compensating for the unflatness of the radio frequency front-end channel and the phase nonlinearity, may be expressed as TAB_BN [BANDidx, freq, amplitude_value1, phase_value1], and is a table consisting of four elements, where BANDidx represents a frequency band index number which corresponds to the radio frequency front-end channel configuration, freq represents a working carrier frequency, amplitude_value1 represents a first amplitude compensation amount, and phase_value1 represents a first phase compensation amount.

For example, the preset frequency domain compensation table of baseband is used for compensating for the unflatness of the transmitter channel and the phase nonlinearity, may be expressed as TAB_CH [CHBWidx, foffset_sc, amplitude_value2, phase_value2], and is a table consisting of four elements, where CHBWidx represents a bandwidth index number which corresponds to the transmitter channel configuration, foffset_sc represents a sub-carrier frequency offset, amplitude_value2 represents a second amplitude compensation amount, and phase_value2 represents a second phase compensation amount.

For example, the channel unflatness distortion function when the transmitter works may be expressed as a complex vector of N×1 in the frequency domain and, for example, may be expressed as Channel_flatdist (Bandq, fc, CHBWp, UseScRange), which contains the amplitude distortion characteristic and the phase distortion characteristic. It is to be understood that the channel unflatness distortion function is determined by four configuration parameters: (a) a frequency band Bandq (q=1, 2, . . . , Q) at which the transmitter works; (b) a specific frequency point fc, which is the working carrier frequency and is used for taking into account the effect of the flatness superposition; (c) a chosen bandwidth CHBWp (p=1, 2, . . . , P); and (d) a useful sub-carrier bandwidth range UseScRange. In the above function. UseScRange may be defined according to actual requirements. For example, UseScRange may be an array with a length of R, where the starting frequency offset is fofset_sc_start, the stopping frequency offset is fofset_sc_stop, the space is sub-carrier space (SCS), and R meets the following requirement:

$$R=(\text{offset\_sc\_stop}-\text{foffset\_sc\_start})/SCS+1 \quad (1).$$

In the frequency domain, the relationship between each sub-carrier of a normalized output signal Y (which is an output signal which used for studying the channel flatness effect without considering the transformation effect such as ideal gain and ideal change frequency in the channel) and each sub-carrier of the input signal Xin may be expressed as the following formula:

$$Y(i)=X\text{in}(i)\times\text{Channel\_flatdist}(i),\ i=1,2,\ldots N \quad (2).$$

In the above formula, N represents LEFT point number. The channel unflatness distortion function may also be expressed as the following formula using the amplitude distortion value and the phase distortion value:

$$\text{Channel\_flatdist}(i)=\text{dist\_amplitude\_value}(i)\times\exp(j\times\text{dist\_phase\_value}(i)) \quad (3).$$

In the above formula, j represents a phase rotation.

The technical solution provided by the present embodiments of the present disclosure is used for calculating the target compensation vector of the sub-carrier which may be denoted as Ws, so that the amplitude distortion characteristic and the phase distortion characteristic of Channel_flatdist may be compensated in advance before data Xin enters the transmitter channel and the radio frequency front-end channel. Each sub-carrier meets the following requirement:

$$Ws(i)\times\text{Channel\_flatdist}(i)=1 \quad (4).$$

In the above requirement, i=1, 2, . . . , N. Therefore, the compensated radio frequency output signal Y' may be free from distortion and is represented as the following formula:

$$Y'(i)=X\text{out}(i)\times\text{Channel\_flatdist}(i)=[X\text{in}(i)\times Ws(i)]\times\text{Channel\_flatdist}(i)=X\text{in}(i) \quad (5).$$

In step 302, a set of first compensation amounts within a corresponding frequency domain range is extracted from the preset frequency domain compensation table of radio frequency according to a current value of the useful sub-carrier bandwidth range and a current value of a frequency band to obtain a first sub-table.

For example, a new sub-table tabbnq, that is, the first sub-table, is formed by extracting table values (that is, first compensation amounts) within a relevant frequency domain range from the preset frequency domain compensation table of radio frequency TAB_BN according to the transmitted useful sub-carrier bandwidth range UseScRange and frequency band parameter BANDq. In some embodiments, a set of table values in which BANDidx==Bandq&(fc+foffset_sc_start≤freq≤fc+foffset_sc_stop) meets the condition in the TAB_BN table is taken as a sub-table tab_bnq.

In step 303, a set of second compensation amounts within a corresponding frequency domain range is extracted from the preset frequency domain compensation table of baseband according to the current value of the useful sub-carrier bandwidth range and the current value of the frequency band to obtain a second sub-table.

For example, a new sub-table tab_chp, that is, the second sub-table, is formed by extracting table values (that is, second compensation amounts) within a relevant frequency domain range from the preset frequency domain compensation table of baseband TAB_CN according to the transmitted useful sub-carrier bandwidth range UseScRange and bandwidth parameter CHBWp. In some embodiments, all values of CHBWidx==CHBWp&(foffset_sc_start≤foffset_sc_foffset_sc_stop) in the TAB_BN table are taken as a sub-table tab_chp.

In step 304, merge processing is performed to the first sub-table and the second sub-table, and the target compensation vector is determined according to a merge result.

In some embodiments, this step may include the following steps: with a frequency coordinate of one of the first sub-table and the second sub-table as a reference, the first sub-table and the second sub-table are merged into an initial compensation vector using a preset interpolation method, where the length of the initial compensation vector is equal to the length corresponding to the current value of the useful sub-carrier bandwidth range; and on the basis of the initial compensation vector, with a position corresponding to the current value of the useful sub-carrier bandwidth range as a center, null sub-carriers are added on a left side of the center and a tight side of the center respectively to obtain the target compensation vector, where the length of the target compensation vector is equal to the number of points of the inverse fast Fourier transform operation.

It is to be understood that the step where on the basis of the initial compensation vector, with a position corresponding to the current value of the useful sub-carrier bandwidth range as a center, null sub-carriers are added on a left side of the center and a tight side of the center respectively to obtain the target compensation vector may include the following step in the specific implantation: null sub-carriers are added one the left side and the right side of the initial compensation vector respectively to obtain the target compensation vector so that the initial compensation vector is basically located at a position of the center in the obtained target compensation vector. For example, the initial compensation vector may be calculated and denoted as Vr, with a length R, that is, the length of the initial compensation vector is the same as the length of the useful sub-carrier. In some embodiments, the compensation amounts in the two sub-tables may be expressed in a coordinate system with the frequency as abscissa and the amplitude as the ordinate, the frequency defined in one of the sub-tables (such as table tab_chp) may be taken as the reference (that is, the unit length of the abscissa is taken as the reference), and the other sub-table (such as table tab_bnq) may be interpolated to a vector with a length of R according to the frequency, so that the first sub-table and the second sub-table are merged. In some embodiments, the preset interpolation method may be linear interpolation or other fitting manners.

For example, after the initial compensation vector is obtained, in order to be able to multiply the input vector of the current sub-carrier and use the output vector corresponding to the product to participate in the inverse fast Fourier transform operation, the further calculation is required to obtain the target compensation vector, where the length of the target compensation vector is the IFFT point number N. In some embodiments, the coefficient 1 may be inserted in the left and right according to the position of UseScRange on the basis of Vr, that is, with the position corresponding to the current value of the useful sub-carrier bandwidth range as the center, a number of null sub-carriers on the left side of foffset_sc_start are added on the left, and a number of null sub-carriers on the right side of foffset_sc_stop are added on the right.

In step 305, an output vector of the current sub-carrier is determined according to a product of the input vector and the target compensation vector, where the output vector is used in an inverse fast Fourier transform operation.

For example, the calculation manner is as follows:

$$Xout=Xin(i) \times Ws(i),\ i=1,2,\ldots,N \quad (6).$$

Figure 6:
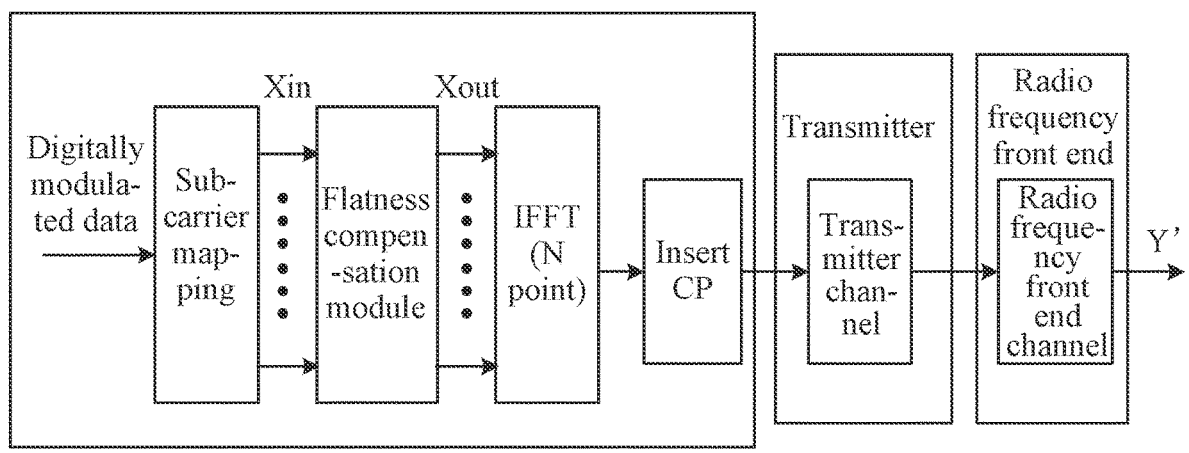
FIG. 6 is a block diagram of a transmitting link with flatness compensation according to Embodiment two of the present disclosure.
Figure 7:
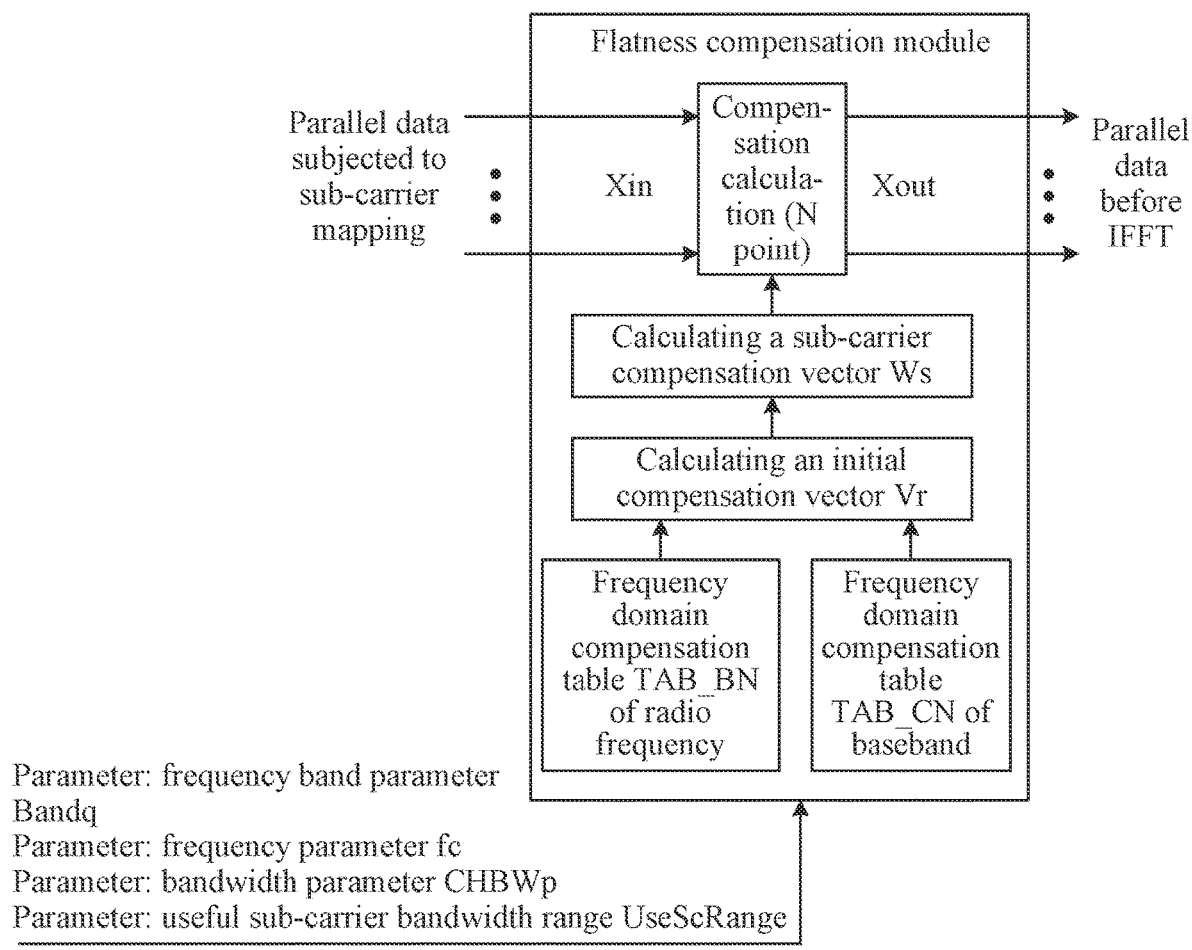
FIG. 7 is a schematic diagram of a flatness compensation process according to Embodiment two of the present disclosure.

For ease of understanding, FIG. 6 shows a block diagram of a transmitting link with flatness compensation according to Embodiment two of the present disclosure. The flatness compensation module in FIG. 6 is used for implementing the channel flatness compensation scheme provided by the present embodiments of the present disclosure for the transmitting link. FIG. 7 shows a schematic diagram of a flatness compensation process according to Embodiment two of the present disclosure. The parallel data that has subjected to sub-carrier mapping is inputted to the flatness compensation module. In the flatness compensation module, a frequency band parameter Bandq, a carrier frequency parameter fc, a bandwidth parameter CHBWp and a useful sub-carrier bandwidth range UseScRange are obtained, a preset frequency domain compensation table of radio frequency TAB_BN and a preset frequency domain compensation table of baseband TAB_CH are queried, an initial compensation vector Vr is calculated, a sub-carrier compensation vector is calculated, that is, a target compensation vector Ws is obtained, then compensation calculation is performed by multiplying Ws on the basis of an input vector Xin to obtain an output vector Xout, and finally, the parallel data before IFFT is obtained.

The channel flatness compensation method provided by the present embodiments of the present disclosure, a preset frequency domain compensation table of radio frequency and a baseband frequency domain compensation table may be set in advance, the flatness calibration value of each sub-carrier of OFDM signals of a current bandwidth, a frequency band and a carrier frequency is calculated, and the flatness is compensated using the frequency domain sub-carrier. Therefore, the flatness of transmitting radio frequency can be improved, the channel flatness of transmitting OFDM symbols can be compensated immediately, the filtering parameters do not need to be reconfigured, no response time needs to wait, the method is suitable for multi-band signals in a wide bandwidth, large frequency domain range and multi-bandwidth mode, the streaming of a baseband data channel is continuously valid, the problem of useless excessive data existing in the response time due to filter configuration does not exist, and the compensation accuracy can reach the sub-carrier level. In addition, the calculation amount and hardware overhead are small, and the convolution operation is changed to the multiplication operation, thereby achieving the effect of improving the nonlinear distortion of the phase.

On the basis of the above-mentioned embodiments, the preset configuration parameters include a useful sub-carrier bandwidth range, a carrier frequency, a frequency band and a bandwidth. The preset frequency domain compensation table of radio frequency may be calibrated in the following manner: values of elements in the preset frequency domain compensation table of radio frequency are set as 1 and values of elements in the preset frequency domain compensation table of baseband are set as 1; values of bandwidths in the preset frequency domain compensation table of baseband are set as a preset fixed bandwidth, and a value of the useful sub-carrier bandwidth range is set as a single sub-carrier width; for each value of the frequency band, output frequencies of a transmitter are set to be scanned sequentially according to a first preset accuracy, a first distortion amount corresponding to each of the output frequencies is acquired through an instrument connected with a radio frequency front end, and the corresponding first compensation amount is determined according to the first distortion amount; and a calibrated preset frequency domain compensation table of radio frequency is determined according to the first compensation amount. Such an arrangement has the advantage that an accurate preset frequency domain compensation table of radio frequency can be obtained and the accuracy of flatness compensation can be improved.

Figure 8:
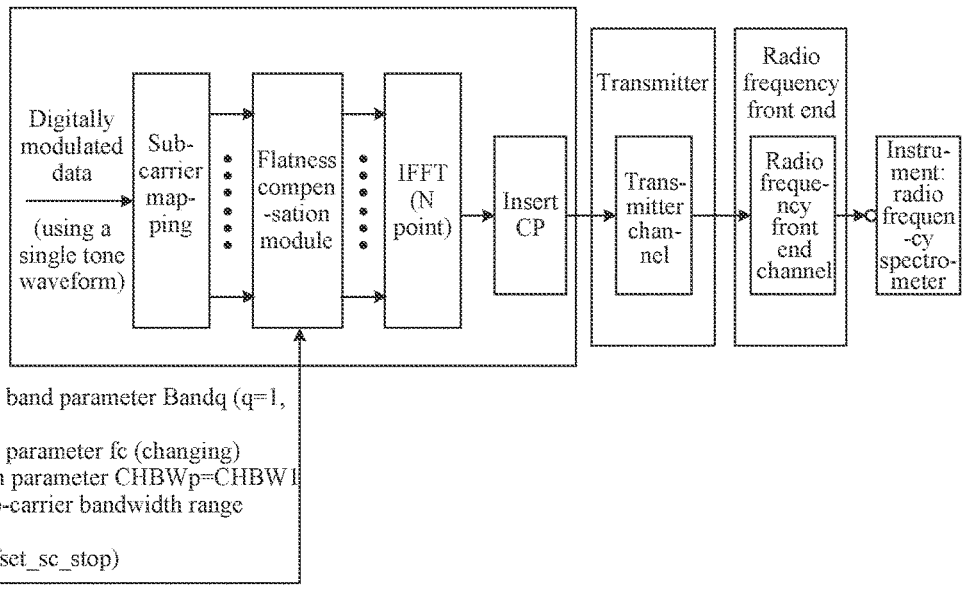
FIG. 8 is a schematic diagram of calibration process of a preset frequency domain compensation table of radio frequency according to an embodiment of the present disclosure.

For example, FIG. 8 is a schematic diagram of calibration process of a preset frequency domain compensation table of radio frequency according to an embodiment of the present disclosure. The preset frequency domain compensation table of radio frequency TAB_BN is calibrated using a spectrometer and a single tone signal. First, values of elements in the preset frequency domain compensation table of radio frequency are all set as 1 and values of elements in the preset frequency domain compensation table of baseband are all set as 1, which is equivalent to a bypass. During working (that is, during the calibration), the bandwidth configuration of the transmitter is fixed as CHBWp=CHBW1, UseScRange is a single sub-carrier width, that is, foffset_sc_start=foffset_sc_stop, so that a single tone signal is outputted and the radio frequency front-end channel configuration Bandq=BAND1 . . . BANDQ is changed, for each specific configuration Bandq, a transmitter output frequency freq is set to be sequentially scanned according to a preset accuracy (which may be denoted as AccFn and may be set according to actual requirements, for example, which is set according to the required compensation accuracy and compensation efficiency) to obtain the amplitude distortion value dist_amplitude_value1 and the phase distortion value dist_phase_value1 corresponding to the freq frequency point, and then the two values are filled into TAB_BN in which values are [BANDidx, freq, 1/dist_amplitude_value1, −1×dist_phase_value1] respectively. That is, the first distortion amount includes a first amplitude distortion amount and a first phase distortion amount, the first amplitude compensation amount is equal to 1/first amplitude distortion amount, and the first phase compensation amount is equal to −1×first phase distortion amount.

On the basis of the above-mentioned embodiment, the preset frequency domain compensation table of baseband may be calibrated in the following manner: the values of the elements in the preset frequency domain compensation table of baseband are set as 1; a frequency band in the calibrated preset frequency domain compensation table of radio frequency is set as a preset fixed frequency band, and a carrier frequency in the calibrated preset frequency domain compensation table of radio frequency is set as a preset fixed carrier frequency; and for each value of the bandwidth, the value of the useful sub-carrier bandwidth range is set as a maximum configurable sub-carrier range corresponding to a current bandwidth, a second distortion amount corresponding to each sub-carrier frequency offset is acquired through the instrument connected with the radio frequency front end, and the corresponding second compensation amount is determined according to the second distortion amount, where a valid data of the preset orthogonal frequency division multiplexing signal reaches a maximum number of configurable sub-carriers.

Figure 9:
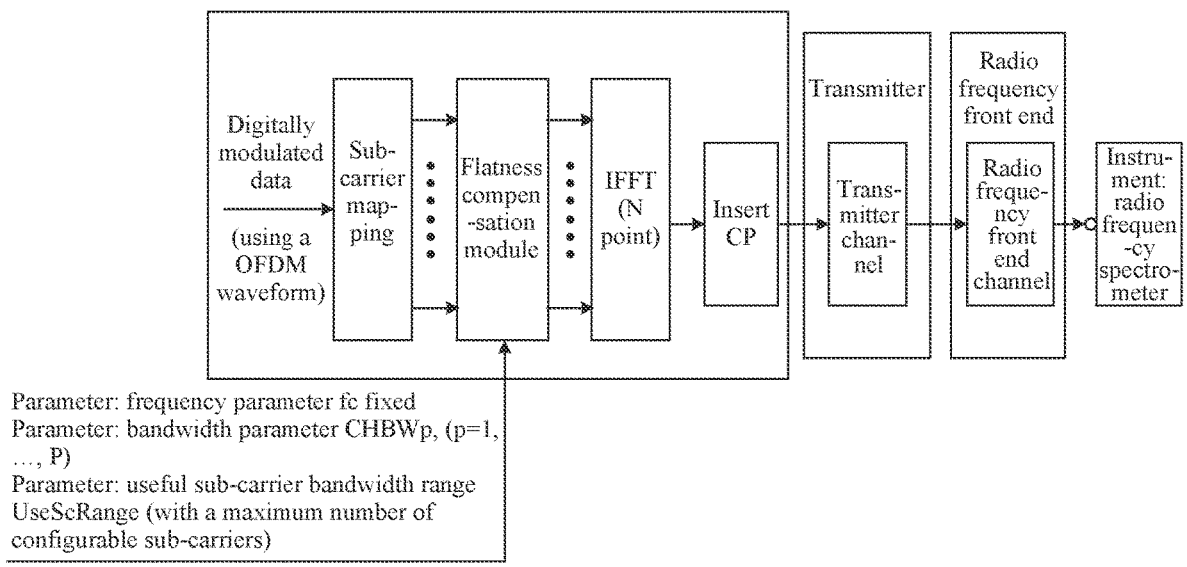
FIG. 9 is a schematic diagram of calibration process of a preset frequency domain compensation table of baseband according to an embodiment of the present disclosure.

For example, FIG. 9 is a schematic diagram of calibration process of a preset frequency domain compensation table of baseband according to an embodiment of the present disclosure. The preset frequency domain compensation table of baseband TAB_CH is calibrated using a spectrometer and a test OFDM signal (that is, the preset orthogonal frequency division multiplexing signal). The test OFDM signal may be set according to actual requirement and is generally a maximum full bandwidth signal. First, the calibrated parameters are filled into the preset frequency domain compensation table of radio frequency TAB_BN, and parameters in the preset frequency domain compensation table of baseband are all set as 1, which is equivalent to a bypass of this table. During working, the radio frequency front-end channel configuration Bandq=Band1 and the carrier frequency fc are fixed, the transmitter bandwidth configuration CHBWP=CHBW1 . . . CHBWP is changed, the UseScRange is configured to meet the maximum configurable sub-carrier range in the CHBWP configuration, and for each specific configuration CHBWP, a test OFDM signal is sent, and the valid data reaches a maximum number of configurable sub-carriers. The amplitude distortion value dist_amplitude_value2 and the phase distortion value dist_amplitude_value2 of a channel in the frequency offset foffset_sc of each sub-carrier are obtained through instrument demodulation, with the accuracy fixed by the sub-carrier space (SCS) and then filled into TAB_CH in which values are [CHBWidx, foffset_sc, 1/dist_amplitude_value2, −1×dist_amplitude_value2] respectively. That is, the second distortion amount includes a second amplitude distortion amount and a second phase distortion amount, the second amplitude compensation amount is equal to −1×second amplitude distortion amount, and the second phase compensation amount is equal to −1×second phase distortion amount.

It is to be understood that when only one of the preset frequency domain compensation table of radio frequency and the preset frequency domain compensation table of baseband exists, those skilled in the art can perform calibration with reference to the related content described above, and the details are not repeated in the present embodiments of the present disclosure.

Embodiment Three

Figure 10:
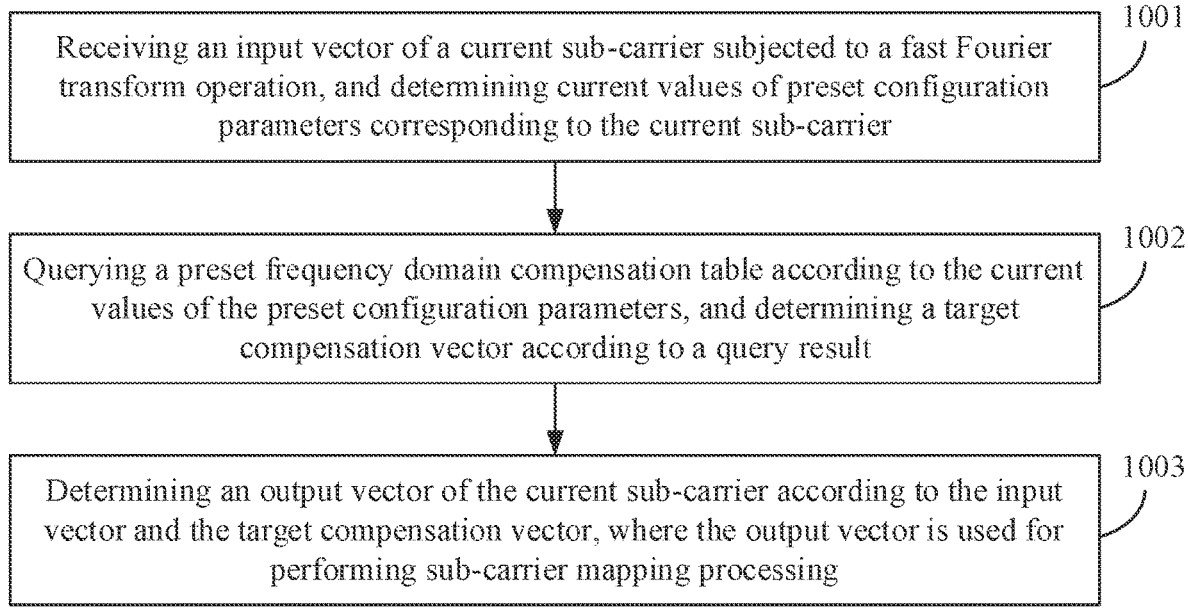
FIG. 10 is a flowchart of a channel flatness compensation method according to Embodiment three of the present disclosure.

FIG. 10 is a flowchart of a channel flatness compensation method according to Embodiment three of the present disclosure. The method may be executed by a channel flatness compensation apparatus. The apparatus may be implemented by hardware and/or software and generally integrated in a terminal device corresponding to a receiving link modulated by orthogonal frequency division multiplexing. As shown in FIG. 10, the method includes steps 1001, 1002 and 1003.

In step 1001, an input vector of a current sub-carrier subjected to a fast Fourier transform operation is received, and current values of preset configuration parameters corresponding to the current sub-carrier is determined.

In the present embodiments of the present disclosure, the flatness compensation processing may be performed on each sub-carrier that has been subjected to the fast Fourier transform operation in the frequency domain one by one or in parallel, and then each sub-carrier that has been subjected to the flatness compensation processing is subjected to sub-carrier mapping processing, so that the compensation accuracy can reach the sub-carrier level.

In step 1002, a preset frequency domain compensation table is queried according to the current values of the preset configuration parameters, and a target compensation vector is determined according to a query result.

In step 1003, an output vector of the current sub-carrier is determined according to the input vector and the target compensation vector, where the output vector is used for performing sub-carrier mapping processing.

The principle and compensation mode of the schemes for the receiving link are same as the principle and compensation mode of the channel flatness compensation schemes for the transmitting link according to the embodiments of the present disclosure, which will not be described in detail in the present embodiments and may refer to the relevant description in the embodiments described above.

In the channel flatness compensation method provided by the present embodiments of the present disclosure, a pre-configured frequency domain compensation table is queried so that the flatness compensation can be performed for the input vector of the sub-carrier in the frequency domain immediately and accurately, the filtering parameters do not need to be reconfigured, no response time needs to wait, and the compensation accuracy can reach the sub-carrier level.

Figure 11:
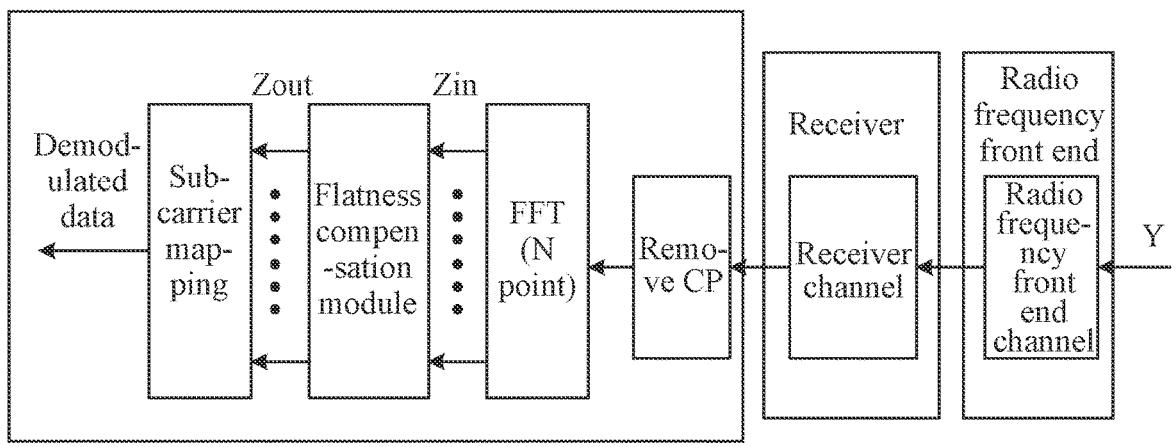
FIG. 11 is a block diagram of a receiving link with flatness compensation according to Embodiment three of the present disclosure.

It is to be understood that the method provided by the present embodiments has the following difference from the method provided in Embodiment one: in Embodiment one, the sub-carrier mapping processing is performed first, and then the inverse fast Fourier transform operation is performed; while in the present embodiments (that is, Embodiment three), the fast Fourier transform operation is performed first, and then the sub-carrier mapping processing is performed. Although the present embodiments are different from Embodiment one in the order of performing the sub-carrier mapping processing and the transform operation, the principle of the present embodiments is the same as the principle of Embodiment one. Therefore, Embodiment one and Embodiment three are two methods based on the same inventive concept. For example, FIG. 11 is a block diagram of a receiving link with flatness compensation according to Embodiment three of the present disclosure. The flatness compensation module (it is to be understood that this flatness compensation module is different from the flatness compensation module in FIG. 6) in FIG. 11 is used for implementing the channel flatness compensation scheme provided by the present embodiments of the present disclosure for the transmitting link. A received signal passes through a radio frequency front-end channel and a receiver channel and subjected to an FFT operation to obtain an input vector Zin of a sub-carrier, the input vector Zin passes through the flatness compensation module to obtain an output, vector Zout, and then the output vector Zout is subjected to the sub-carrier mapping processing to obtain a demodulated data.

In some embodiments, the preset configuration parameters include: a useful sub-carrier bandwidth range, a carrier frequency, and a frequency band and/or a bandwidth; in a case where the preset configuration parameters include a frequency band, the preset frequency domain compensation table includes a preset frequency domain compensation table of radio frequency; and in a case where the preset configuration parameters include a bandwidth, the preset frequency domain compensation table includes a preset frequency domain compensation table of baseband.

In some embodiments, the preset frequency domain compensation table of radio frequency includes a frequency band index number, a carrier frequency and a first compensation amount, where the first compensation amount includes a first amplitude compensation amount; and the preset frequency domain compensation table of baseband includes a bandwidth index number, a sub-carrier frequency offset and a second compensation amount, where the second compensation amount includes a second amplitude compensation amount.

In some embodiments, the first compensation amount also includes a first phase compensation amount; and/or, the second compensation amount also includes a second phase compensation amount.

In some embodiments, the preset configuration parameters include a useful sub-carrier bandwidth range, a carrier frequency, a frequency band and a bandwidth. The step where a preset frequency domain compensation table is queried according to the current values of the preset configuration parameters, and a target compensation vector is determined according to a query result includes: a set of first compensation amounts within a corresponding frequency domain range is extracted from the preset frequency domain compensation table of radio frequency according to a current value of the useful sub-carrier bandwidth range and a current value of a frequency band to obtain a first sub-table; a set of second compensation amounts within a corresponding frequency domain range is extracted from the preset frequency domain compensation table of baseband according to the current value of the useful sub-carrier bandwidth range and the current value of the frequency band to obtain a second sub-table; and merge processing is performed to the first sub-table and the second sub-table, and the target compensation vector is determined according to a merge result.

In some embodiments, the step where merge processing is performed to the first sub-table and the second sub-table, and the target compensation vector is determined according to a merge result includes: with a frequency coordinate of one of the first sub-table and the second sub-table as a reference, the first sub-table and the second sub-table are merged into an initial compensation vector using a preset interpolation method, where the length of the initial compensation vector is equal to the length corresponding to the current value of the useful sub-carrier bandwidth range; and on the basis of the initial compensation vector, with a position corresponding to the current value of the useful sub-carrier bandwidth range as a center, null sub-carriers are added on a left side of the center and a right side of the center respectively to obtain the target compensation vector, where the length of the target compensation vector is equal to the number of points of the inverse fast Fourier transform operation.

In some embodiments, the step where an output vector of the current sub-carrier is determined according to the input vector and the target compensation vector includes: the output vector of the current sub-carrier is determined according to a product of the input vector and the target compensation vector.

In some embodiments, the preset configuration parameters include a useful sub-carrier bandwidth range, a carrier frequency, a frequency band and a bandwidth. The preset frequency domain compensation table of radio frequency is calibrated in the following manner: values of elements in the preset frequency domain compensation table of radio frequency and the preset frequency domain compensation table of baseband are set as 1; values of bandwidths in the preset frequency domain compensation table of baseband are set as a preset fixed bandwidth, and a value of the useful sub-carrier bandwidth range is set as a single sub-carrier width; for each value of the frequency band, output frequencies of a transmitter are set to be scanned sequentially according to a first preset accuracy, a first distortion amount corresponding to each of the output frequencies is acquired through an instrument connected with a radio frequency front end, and the corresponding first compensation amount is determined according to the first distortion amount; and a calibrated preset frequency domain compensation table of radio frequency is determined according to the first compensation amount.

In some embodiments, the preset frequency domain compensation table of baseband is calibrated in the following manner: on the basis of the above-mentioned calibrated preset frequency domain compensation table of radio frequency, the values of the elements in the preset frequency domain compensation table of baseband are set as 1; a frequency band in the calibrated preset frequency domain compensation table of radio frequency is set as a preset fixed frequency band, and a carrier frequency in the calibrated preset frequency domain compensation table of radio frequency is set as a preset fixed carrier frequency; for each value of the bandwidth, the value of the useful sub-carrier bandwidth range is set as a maximum configurable sub-carrier range corresponding to a current bandwidth, a preset orthogonal frequency division multiplexing signal is sent for the current bandwidth, a second distortion amount corresponding to each sub-carrier frequency offset is acquired through the instalment connected with the radio frequency front end, and the corresponding second compensation amount is determined according to the second distortion amount, where a valid data of the preset orthogonal frequency division multiplexing signal reaches a maximum number of configurable sub-carriers; and a calibrated preset frequency domain compensation table of baseband is determined according to the second compensation amount.

It is to be understood that only the instrument and demodulation position used in the receiving calibration are different from the instrument and demodulation position in the transmitting calibration, the principle of the receiving calibration is the same as the principle of the transmitting calibration, and because characteristics of the receiving link and the transmitting link are different, the compensation table calibration process and compensation parameters of the receiving link and the transmitting link are independent of each other.

Embodiment Four

Figure 12:
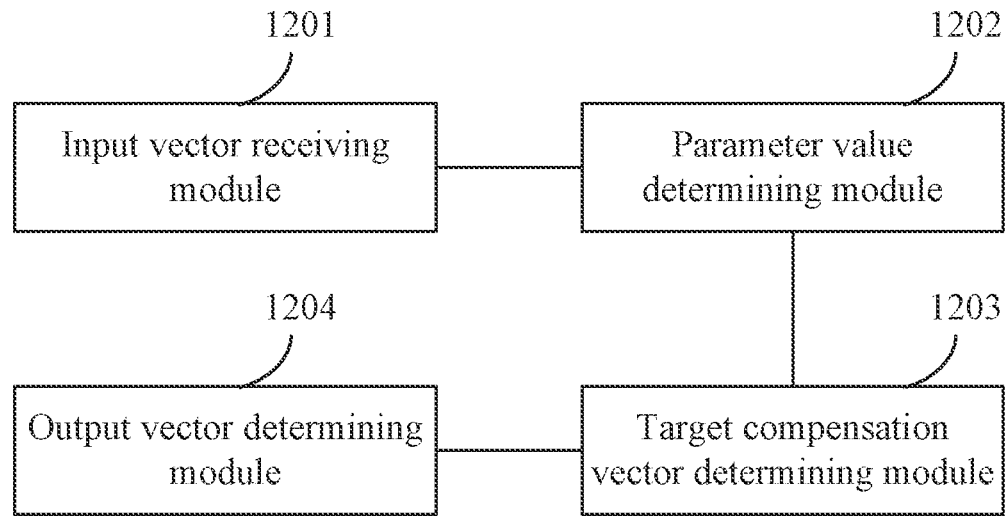
FIG. 12 is a block diagram of a channel flatness compensation apparatus according to Embodiment four of the present disclosure.

FIG. 12 is a block diagram of a channel flatness compensation apparatus according to Embodiment four of the present disclosure. The apparatus may be implemented by hardware and/or software, is generally integrated in a terminal device corresponding to a transmitting link modulated by orthogonal frequency division multiplexing, and may perform channel flatness compensation by executing the channel flatness compensation method applied to the transmitting link. As shown in FIG. 12, the apparatus includes an input vector receiving module 1201, a parameter value determining module 1202, a target compensation vector determining module 1203 and an output vector determining module 1204.

The input vector receiving module 1201 is configured to receive an input vector of a current sub-carder subjected to sub-carrier mapping processing. The parameter value determining module 1202 is configured to determine current values of preset configuration parameters corresponding to the current sub-carrier. The target compensation vector determining module 1203 is configured to query a preset frequency domain compensation table according to the current values of the preset configuration parameters, and determine a target compensation vector according to a query result. The output vector determining module 1204 is configured to determine an output vector of the current sub-carrier according to the input vector and the target compensation vector, where the output vector is used in an inverse fast Fourier transform operation.

In the channel flatness compensation apparatus provided by the present embodiments of the present disclosure, a pre-configured frequency domain compensation table is queried so that the flatness compensation can be performed for the input vector of the sub-carrier in the frequency domain immediately and accurately in the transmitting link, the filtering parameters do not need to be reconfigured, no response time needs to wait, and the compensation accuracy can reach the sub-carrier level.

In some embodiments, the preset configuration parameters include: a useful sub-carrier bandwidth range, a carrier frequency, and a frequency band and/or a bandwidth; in a case where the preset configuration parameters include a frequency band, the preset frequency domain compensation table includes a preset frequency domain compensation table of radio frequency; and in a case where the preset configuration parameters include a bandwidth, the preset frequency domain compensation table includes a preset frequency domain compensation table of baseband.

In some embodiments, the preset frequency domain compensation table of radio frequency includes a frequency band index number, a carrier frequency and a first compensation amount, where the first compensation amount includes a first amplitude compensation amount; and the preset frequency domain compensation table of baseband includes a bandwidth index number, a sub-carrier frequency offset and a second compensation amount, where the second compensation amount includes a second amplitude compensation amount.

In some embodiments, the first compensation amount also includes a first phase compensation amount; and/or, the second compensation amount also includes a second phase compensation amount.

In some embodiments, the preset configuration parameters include a useful sub-carrier bandwidth range, a carrier frequency, a frequency band and a bandwidth. The operation where the preset frequency domain compensation table is queried according to the current values of the preset configuration parameters, and the target compensation vector is determined according to the query result includes: a set of first compensation amounts within a corresponding frequency domain range is extracted from the preset frequency domain compensation table of radio frequency according to a current value of the useful sub-carrier bandwidth range and a current value of a frequency band to obtain a first sub-table; a set of second compensation amounts within a corresponding frequency domain range is extracted from the preset frequency domain compensation table of baseband according to the current value of the useful sub-carrier bandwidth range and the current value of the frequency band to obtain a second sub-table; and merge processing is performed to the first sub-table and the second sub-table, and the target compensation vector is determined according to a merge result.

In some embodiments, the operation where merge processing is performed to the first sub-table and the second sib-table, and the target compensation vector is determined according to the merge result includes: with a frequency coordinate of one of the first sub-table and the second sub-table as a reference, the first sub-table and the second sub-table are merged into an initial compensation vector using a preset interpolation method, where the length of the initial compensation vector is equal to the length corresponding to the current value of the useful sub-carrier bandwidth range; and on the basis of the initial compensation vector, with a position corresponding to the current value of the useful sub-carrier bandwidth range as a center, null sub-carriers are added on a left side of the center and a right side of the center respectively to obtain the target compensation vector, where the length of the target compensation vector is equal to the number of points of the inverse fast Fourier transform operation.

In some embodiments, the operation where the output vector of the current sub-carrier is determined according to the input vector and the target compensation vector includes: the output vector of the current sub-carrier is determined according to a product of the input vector and the target compensation vector.

In some embodiments, the preset configuration parameters include a useful sub-carrier bandwidth range, a carrier frequency, a frequency band and a bandwidth. The preset frequency domain compensation table of radio frequency is calibrated in the following manner: values of elements in the preset frequency domain compensation table of radio frequency and the preset frequency domain compensation table of baseband are set as 1; values of bandwidths in the preset frequency domain compensation table of baseband are set as a preset fixed bandwidth, and a value of the useful sub-carrier bandwidth range is set as a single sub-carrier width; for each value of the frequency band, output frequencies of a transmitter are set to be scanned sequentially according to a first preset accuracy, a first distortion amount corresponding to each of the output frequencies is acquired through an instrument connected with a radio frequency front end, and the corresponding first compensation amount is determined according to the first distortion amount; and a calibrated preset frequency domain compensation table of radio frequency is determined according to the first compensation amount.

In some embodiments, the preset frequency domain compensation table of baseband is calibrated in the following manner: on the basis of the above-mentioned calibrated preset frequency domain compensation table of radio frequency, the values of the elements in the preset frequency domain compensation table of baseband are set as 1; a frequency band in the calibrated preset frequency domain compensation table of radio frequency is set as a preset fixed frequency band, and a carrier frequency in the calibrated preset frequency domain compensation table of radio frequency is set as a preset fixed carrier frequency; for each value of the bandwidth, the value of the useful sub-carrier bandwidth range is set as a maximum configurable sub-carrier range corresponding to a current bandwidth, a preset orthogonal frequency division multiplexing signal is sent for the current bandwidth, a second distortion amount corresponding to each sub-carrier frequency offset is acquired through the instrument connected with the radio frequency front end, and the corresponding second compensation amount is determined according to the second distortion amount, where a valid data of the preset orthogonal frequency division multiplexing signal reaches a maximum number of configurable sub-carriers; and a calibrated preset frequency domain compensation table of baseband is determined according to the second compensation amount.

Embodiment Five

Figure 13:
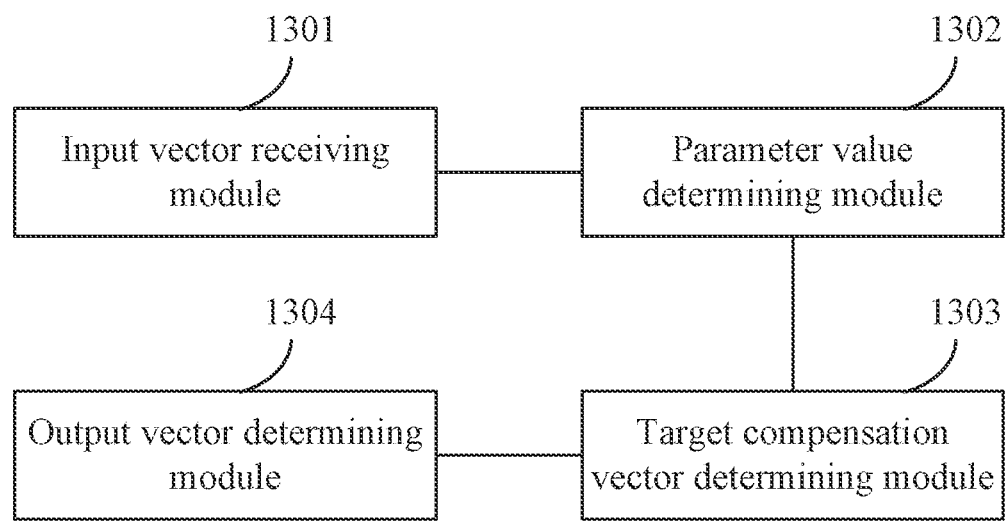
FIG. 13 is a block diagram of a channel flatness compensation apparatus according to Embodiment five of the present disclosure.

FIG. 13 is a block diagram of a channel flatness compensation apparatus according to Embodiment five of the present disclosure. The apparatus may be implemented by hardware and/or software, is generally integrated in a terminal device corresponding to a receiving link modulated by orthogonal frequency division multiplexing, and may perform channel flatness compensation by executing the channel flatness compensation method applied to the receiving link. As shown in FIG. 13, the apparatus includes: an output vector receiving module 1301, which is configured to receive an input vector of a current sub-carrier subjected to a fast Fourier transform operation; a parameter value determining module 1302, which is configured to determine current values of preset configuration parameters corresponding to the current sub-carrier; a target compensation vector determining module 1303, which is configured to query a preset frequency domain compensation table according to the current values of the preset configuration parameters, and determine a target compensation vector according to a query result; and an output vector determining module 1304, which is configured to determine an output vector of the current sub-carrier according to the input vector and the target compensation vector, where the output vector is used for performing sub-carrier mapping processing.

In the channel flatness compensation apparatus provided by the present embodiments of the present disclosure, a pre-configured frequency domain compensation table is queried so that the flatness compensation can be performed for the input vector of the sub-carrier in the frequency domain immediately and accurately in the receiving link, the filtering parameters do not need to be reconfigured, no response time needs to wait, and the compensation accuracy can reach the sub-carrier level.

Embodiment Six

An embodiment of the present disclosure further provides a non-transitory storage medium including a computer-executable instruction, where the computer-executable instruction is used for, when executed by a computer processor, performing a channel flatness compensation method that includes the steps described below.

An input vector of a current sub-carrier subjected to sub-carrier mapping processing is received, and current values of preset configuration parameters corresponding to the current sub-carrier is determined; a preset frequency domain compensation table is queried according to the current values of the preset configuration parameters, and a target compensation vector is determined according to a query result; and an output vector of the current sub-carrier is determined according to the input vector and the target compensation vector, where the output vector is used in an inverse fast Fourier transform operation. Alternatively, the channel flatness compensation method includes the steps: an input vector of a current sub-carrier subjected to sub-carrier mapping processing is received, and current values of preset configuration parameters corresponding to the current sub-carrier is determined; a preset frequency domain compensation table is queried according to the current values of the preset configuration parameters, and a target compensation vector is determined according to a query result; an output vector of the current sub-carrier is determined according to the input vector and the target compensation vector, where the output vector is used for performing sub-carrier mapping processing.

The storage medium is any one of various types of memory device or storage device. The term "storage medium" is intended to include a mounting medium such as a compact disc read-only memory (CD-ROM), a floppy disk or a magnetic tape apparatus; a computer system memory or a random-access memory (RAM) such as a dynamic random-access memory (DRAM), a double data rate (DDR) RAM, a static random-access memory (SRAM), an extended data out (EDO) RAM, or a Rambus RAM; a non-volatile memory such as a flash memory or a magnetic medium (such as a hard disk or an optical storage device); a register or other similar types of memory elements. The storage medium may also include other types of memory or combinations thereof. In addition, the storage medium may be located in a first computer system in which programs are executed, or may be located in a second different computer system which connects to the first computer system over a network (for example, the Internet). The second computer system may provide program instructions for a first computer for execution. The term "storage medium" may include two or more storage media which can reside at different positions (for example, in different computer systems connected over a network). The storage medium may store program instructions (which, for example, are embodied as computer programs) which are executable by one or more processors.

Of course, in the storage medium including computer-executable instructions provided by the present embodiments of the present disclosure, the computer-executable instruction implements not only the operations for channel flatness compensation described above but also related operations in the channel flatness compensation method according to any embodiment of the present disclosure.

Embodiment Seven

Figure 14:
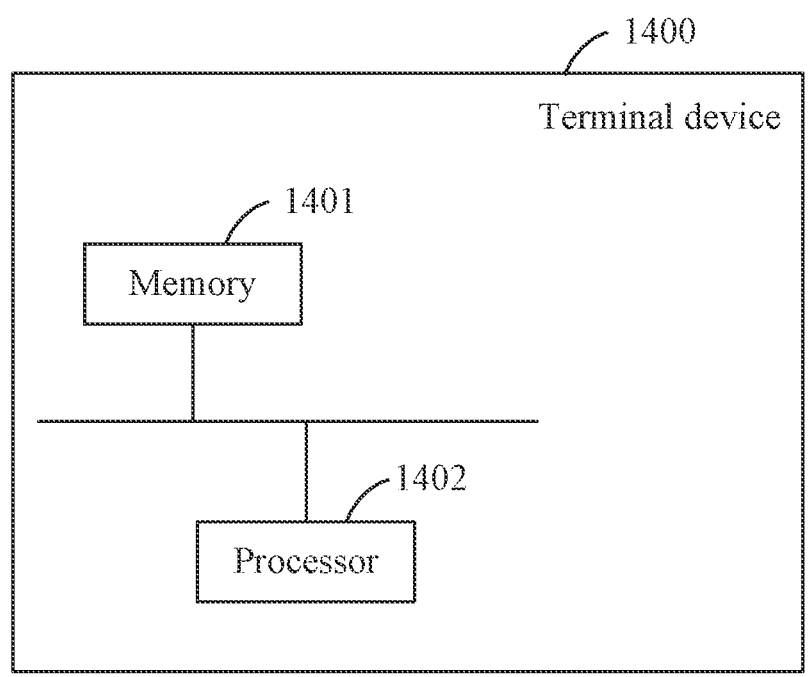
FIG. 14 is a block diagram of a terminal device according to Embodiment eight of the present disclosure.

Embodiments of the present disclosure further provides a baseband chip storing a computer program, where the computer program, when executed by a processor, performs the channel flatness compensation method according to the embodiments of the present disclosure. The baseband chip may include a chip manufactured based on the FPGA technology or the ASIC technology.

Embodiment Eight Embodiments of the present disclosure further provide a terminal device which may integrate the channel flatness compensation apparatus according to the embodiments of the present disclosure. FIG. 14 is a block diagram of a terminal device according to Embodiment eight of the present disclosure. The terminal device 1400 may include a memory 1401, a processor 1402 and a computer program stored in the memory 1401 and executable by the processor. The processor 1402, when executing the computer program, performs the channel flatness compensation method described in the embodiments of the present disclosure.

In the terminal device provided by the present embodiments of the present disclosure, a pre-configured frequency domain compensation table is queried so that the flatness compensation can be performed for the input vector of the sub-carrier in the frequency domain immediately and accurately in a transmitting link or a receiving link, the filtering parameters do not need to be reconfigured, no response time needs to wait, and the compensation accuracy can reach the sub-carrier level.

The channel flatness compensation apparatus, the storage medium, the baseband chip and the terminal device according to the above-mentioned embodiments can perform the channel flatness compensation method provided by the corresponding embodiments of the present disclosure and have function modules and beneficial effects corresponding to the executed method. For technology details that not described in detail in the above-mentioned embodiments, reference may be made to the channel flatness compensation method according to corresponding embodiments of the present disclosure.

What is claimed is:

1. A channel flatness compensation method, applied to a transmitting link modulated by orthogonal frequency division multiplexing and comprising:
    receiving an input vector of a current sub-carrier subjected to sub-carrier mapping processing, and determining current values of preset configuration parameters corresponding to the current sub-carrier;
    querying a preset frequency domain compensation table according to the current values of the preset configuration parameters, and determining a target compensation vector according to a query result; and
    determining an output vector of the current sub-carrier according to the input vector and the target compensation vector, wherein the output vector is used in an inverse fast Fourier transform operation;
    wherein the preset configuration parameters comprise: a useful sub-carrier bandwidth range, a carrier frequency, and at least one of a frequency band or a bandwidth.

2. The method according to claim 1, wherein in a case where the preset configuration parameters comprise: the useful sub-carrier bandwidth range, the carrier frequency and the frequency band, the preset frequency domain compensation table comprises a preset frequency domain compensation table of radio frequency.

3. The method according to claim 1, wherein in a case where the preset configuration parameters comprise: the useful sub-carrier bandwidth range, the carrier frequency and the bandwidth, the preset frequency domain compensation table comprises a preset frequency domain compensation table of baseband.

4. The method according to claim 2, wherein the preset frequency domain compensation table of radio frequency comprises a frequency band index number, a carrier frequency and a first compensation amount, wherein the first compensation amount comprises a first amplitude compensation amount.

5. The method according to claim 3, wherein the preset frequency domain compensation table of baseband comprises a bandwidth index number, a sub-carrier frequency offset and a second compensation amount, wherein the second compensation amount comprises a second amplitude compensation amount.

6. The method according to claim 4, wherein the first compensation amount further comprises a first phase compensation amount.

7. The method according to claim 5, wherein the second compensation amount further comprises a second phase compensation amount.

8. The method according to claim 1, wherein in a case where the preset configuration parameters comprise the useful sub-carrier bandwidth range, the carrier frequency, the frequency band and the bandwidth, in a case where the preset frequency domain compensation table comprises a preset frequency domain compensation table of radio frequency, the preset frequency domain compensation table of radio frequency comprises a first compensation amount, and in a case where the preset frequency domain compensation table comprises a preset frequency domain compensation table of baseband, the preset frequency domain compensation table of baseband comprises a second compensation amount; and
    wherein querying the preset frequency domain compensation table according to the current values of the preset configuration parameters, and determining the target compensation vector according to the query result comprises:
    extracting a set of first compensation amounts within a corresponding frequency domain range from the preset frequency domain compensation table of radio frequency according to a current value of the useful sub-carrier bandwidth range and a current value of a frequency band to obtain a first sub-table;
    extracting a set of second compensation amounts within a corresponding frequency domain range from the preset frequency domain compensation table of baseband according to the current value of the useful sub-carrier bandwidth range and the current value of the frequency band to obtain a second sub-table; and
    performing merge processing to the first sub-table and the second sub-table, and determining a target compensation vector according to a merge result.

9. The method according to claim 8, wherein performing the merge processing to the first sub-table and the second sub-table, and determining the target compensation vector is determined according to the merge result comprises:
    with a frequency coordinate of one of the first sub-table and the second sub-table as a reference, merging the first sub-table and the second sub-table into an initial compensation vector using a preset interpolation method, wherein a length of the initial compensation vector is equal to a length corresponding to the current value of the useful sub-carrier bandwidth range; and
    on a basis of the initial compensation vector, with a position corresponding to the current value of the useful sub-carrier bandwidth range as a center, adding null sub-carriers on a left side of the center and a right side of the center respectively to obtain the target compensation vector, wherein a length of the target compensation vector is equal to a number of points of the inverse fast Fourier transform operation.

10. The method according to claim 1, wherein determining the output vector of the current sub-carrier according to the input vector and the target compensation vector comprises:
determining the output vector of the current sub-carrier according to a product of the input vector and the target compensation vector.

11. The method according to claim 1, wherein in a case where the preset configuration parameters comprise the useful sub-carrier bandwidth range, the carrier frequency, the frequency band and the bandwidth, the preset frequency domain compensation table comprises a preset frequency domain compensation table of radio frequency and a preset frequency domain compensation table of baseband;
wherein the method further comprises: setting values of elements in the preset frequency domain compensation table of radio frequency as 1 and setting values of elements in the preset frequency domain compensation table of baseband as 1;
setting values of bandwidths in the preset frequency domain compensation table of baseband as a preset fixed bandwidth, and setting a value of the useful sub-carrier bandwidth range as a single sub-carrier width;
for each value of the frequency band, setting output frequencies of a transmitter to be scanned sequentially according to a first preset accuracy, acquiring a first distortion amount corresponding to each of the output frequencies through an instrument connected with a radio frequency front end, and determining a corresponding first compensation amount according to the first distortion amount; and
determining a calibrated preset frequency domain compensation table of radio frequency according to the first compensation amount, wherein the preset frequency domain compensation table of radio frequency comprises the first compensation amount.

12. The method according to claim 11, further comprising:
setting a frequency band in the calibrated preset frequency domain compensation table of radio frequency as a preset fixed frequency band, and setting a carrier frequency in the calibrated preset frequency domain compensation table of radio frequency as a preset fixed carrier frequency;
for each value of the bandwidth, setting the value of the useful sub-carrier bandwidth range as a maximum configurable sub-carrier range corresponding to a current bandwidth, sending a preset orthogonal frequency division multiplexing signal for the current bandwidth, acquiring a second distortion amount corresponding to each sub-carrier frequency offset through the instrument connected with the radio frequency front end, and determining the corresponding second compensation amount according to the second distortion amount, wherein a valid data of the preset orthogonal frequency division multiplexing signal reaches a maximum number of configurable sub-carriers; and
determining a calibrated preset frequency domain compensation table of baseband according to the second compensation amount.

13. A channel flatness compensation method, applied to a receiving link modulated by orthogonal frequency division multiplexing and comprising:
receiving an input vector of a current sub-carrier subjected to a fast Fourier transform operation, and determining current values of preset configuration parameters corresponding to the current sub-carrier;
querying a preset frequency domain compensation table according to the current values of the preset configuration parameters, and determining a target compensation vector according to a query result; and
determining an output vector of the current sub-carrier according to the input vector and the target compensation vector, wherein the output vector is used for performing sub-carrier mapping processing;
wherein the preset configuration parameters comprise: a useful sub-carrier bandwidth range, a carrier frequency, and at least one of a frequency band or a bandwidth.

14. A non-transitory computer-readable storage medium storing a computer program, wherein the computer program, when executed by a processor, performs the method according to claim 1.

15. A non-transitory baseband chip storing a computer program, wherein the computer program, when executed by a processor, performs the method according to claim 1.

16. A terminal device, comprising a memory, a processor, and a computer program stored in the memory and executable by the processor, wherein the processor, when executing the computer program, performs:
receiving an input vector of a current sub-carrier subjected to sub-carrier mapping processing, and determining current values of preset configuration parameters corresponding to the current sub-carrier;
querying a preset frequency domain compensation table according to the current values of the preset configuration parameters, and determining a target compensation vector according to a query result; and
determining an output vector of the current sub-carrier according to the input vector and the target compensation vector, wherein the output vector is used in an inverse fast Fourier transform operation;
wherein the preset configuration parameters comprise: a useful sub-carrier bandwidth range, a carrier frequency, and at least one of a frequency band or a bandwidth.

17. The terminal device according to claim 16, wherein in a case where the preset configuration parameters comprise: the useful sub-carrier bandwidth range, the carrier frequency and the frequency band, the preset frequency domain compensation table comprises a preset frequency domain compensation table of radio frequency.

18. The terminal device according to claim 16, wherein in a case where the preset configuration parameters comprise: the useful sub-carrier bandwidth range, the carrier frequency and the bandwidth, the preset frequency domain compensation table comprises a preset frequency domain compensation table of baseband.

19. The terminal device according to claim 17, wherein the preset frequency domain compensation table of radio frequency comprises a frequency band index number, a carrier frequency and a first compensation amount, wherein the first compensation amount comprises a first amplitude compensation amount.

20. The terminal device according to claim 18, wherein the preset frequency domain compensation table of baseband comprises a bandwidth index number, a sub-carrier frequency offset and a second compensation amount, wherein the second compensation amount comprises a second amplitude compensation amount.

* * * * *